Jan. 16, 1962     O. P. M. GOSS     3,016,744
HYGROMETER
Filed July 6, 1959     2 Sheets-Sheet 1
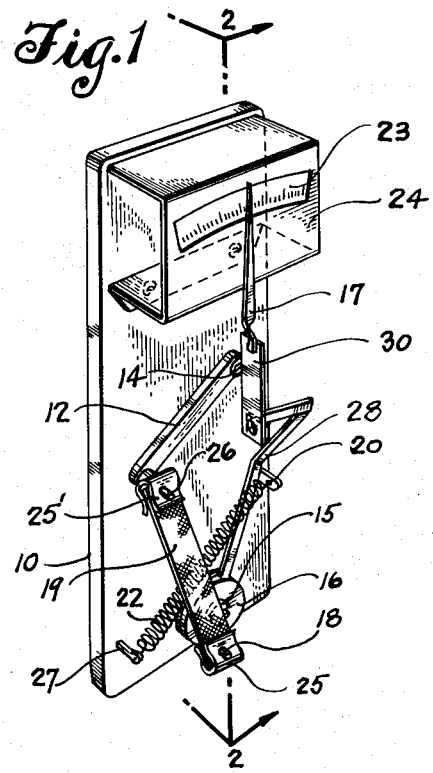
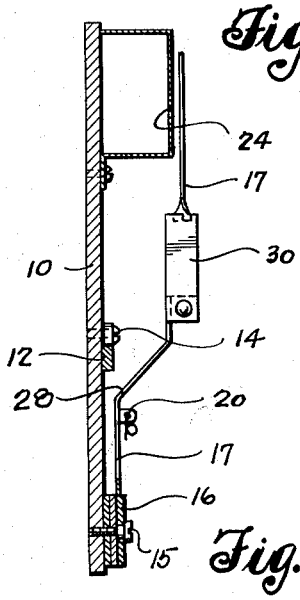
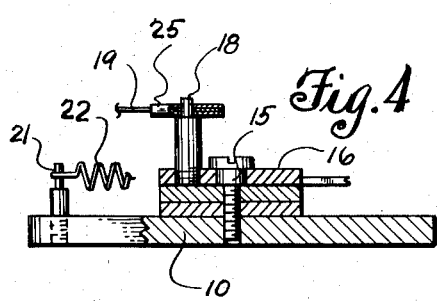
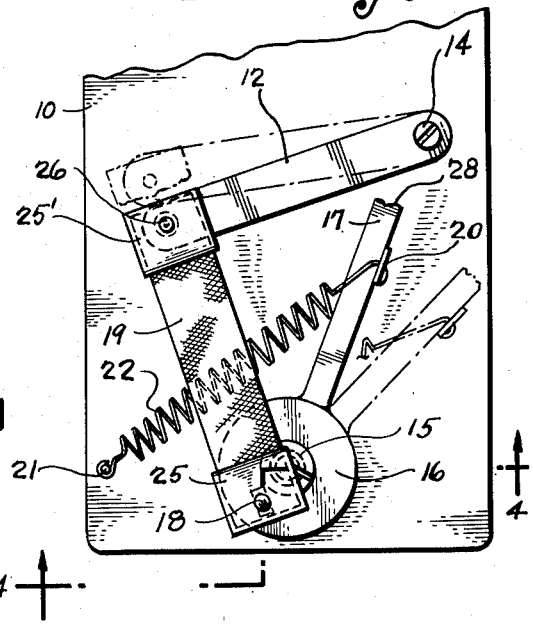
INVENTOR.
OLIVER P. M. GOSS
BY
Robinson & Berry
ATTORNEYS Jan. 16, 1962   O. P. M. GOSS   3,016,744
HYGROMETER
Filed July 6, 1959   2 Sheets-Sheet 2
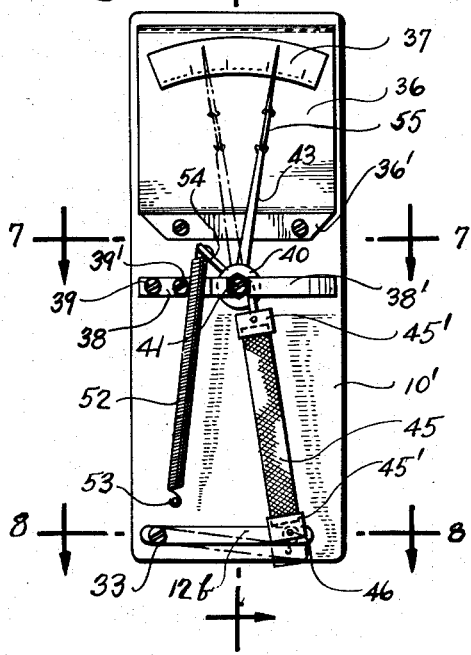
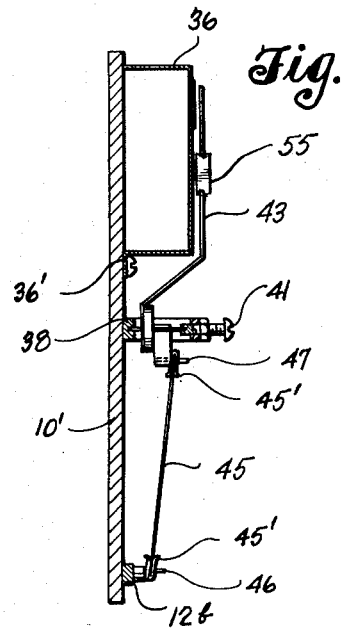
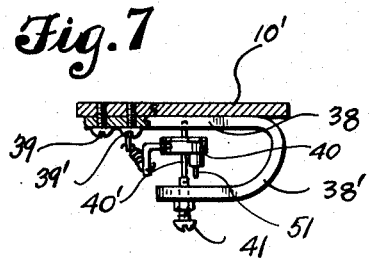
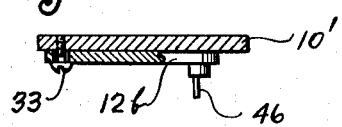
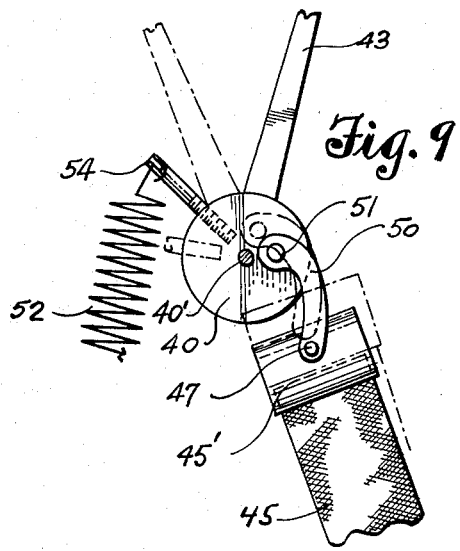
INVENTOR.
OLIVER P. M. GOSS
BY
Robinson & Berry
ATTORNEYS

United States Patent Office 3,016,744
Patented Jan. 16, 1962

3,016,744
HYGROMETER
Oliver P. M. Goss, 4750 16th NE., Seattle, Wash.
Filed July 6, 1959, Ser. No. 824,982
9 Claims. (Cl. 73—337.5)

This invention relates to hygrometers. More particularly, it has reference to certain improvements in hygrometers, which are controlled by a humidity sensitive element, whereby their accuracy in indicating the relative humidity through a wide range of temperatures is improved and whereby the tension to which the humidity sensitive element is subjected is reduced.

More specifically stated, the present invention resides in the provision of a hygrometer, characterized by a novel arrangement of parts whereby inaccuracies of readings made in those ranges of temperature which differ from that in which the instrument was originally calibrated, are compensated for.

It is here to be noted that when a humidity indicator, equipped with a pointer adapted for movement along a graduated scale, in accordance with the changes in length of a humidity sensitive element, such as a hair, horn strip, or the like, is calibrated in a temperature of, for example, 80° F., its pointer moves definite distances for definite changes of humidity at that temperature. However, if the same instrument is calibrated in a temperature at 60° F., its pointer will have a lesser movement in those same changes of relative humidity. Thus, an instrument calibrated in any certain degree of temperature will be somewhat in error when used in indicating changes of relative humidity in temperatures other than that in which the instrument was originally calibrated.

In view of the foregoing, it has been the principal object of this invention to provide a humidity indicator that will accurately indicate the relative humidity when used in any temperature in the normal range, for example, over a range of from 40° F. to 90° F.

It is also an object of this invention to provide an instrument in which the pointer has means associated therewith that compensates for any inaccuracy in its indications that, without said means, would be due to temperature changes.

More particularly the present invention relates to the novel arrangement of parts as operated incident to the lengthening and shortening of a humidity sensitive element such as a horn strip, hair or the like, to correctly designate the relative humidity over a wide range and at any degree of temperature in the normal range of 40° F. to 100° F., and which also operates with a material reduction of tension on the pointer moving and humidity sensitive element.

Still further objects and advantages of this invention will become apparent as this specification progresses.

In accomplishing the above mentioned and other objects of the present invention, I have provided the improved details of construction, the preferred forms of which are illustrated in the accompanying drawings, wherein:

FIG. 1 is a perspective view of a humidity indicating instrument embodying the improvements of the present invention therein.

FIG. 2 is a vertical section of the same, taken on the line 2—2 in FIG. 1.

FIG. 3 is an enlarged elevation of a part of the device, showing the humidity sensitive element; its mounting means and its connection with the pointer.

FIG. 4 is a cross-sectional view, taken on line 4—4 in FIG. 3.

FIG. 5 is a front elevation of a relative humidity indicator of an alternative form, embodied by the present invention.

FIG. 6 is a vertical section taken on line 6—6 in FIG. 5.

FIG. 7 is a horizontal cross section taken on the line 7—7 in FIG. 5.

FIG. 8 is a horizontal cross section taken on the line 8—8 in FIG. 5.

FIG. 9 is an enlarged, face view of a portion of the pointer mounting and operating means.

Referring more in detail to the drawings and first to the humidistat as shown in FIGS. 1 to 4; this instrument comprises a vertically disposed rectangular back plate 10, preferably of "Bakelite" or the like and against which, across its medial portion, a metal bar 12 is flatly disposed. This bar, as seen best in FIG. 3, is pivotally fixed at its right hand end to plate 10 and is free for vertical adjustment, as presently explained, at its left hand end; the pivot member being a screw 14 that passes through a hole in the bar and which is then threaded into plate 10. This screw may be loosened for bar adjustment and tightened after an adjustment has been made, thus to clamp and secure the adjustment.

Pivotally mounted on plate 10 substantially centrally of its lower end portion by means of a pivot screw 15 passing axially therethrough is a disk or hub member 16 to which the lower end of a pointer 17 is fixed in such manner that the pointer extends radially thereof in an upward direction. Fixed in the disk 16 eccentrically thereof but quite close to the central pivot screw 15, is a pivot stud 18 to which one end of the presently used humidity sensitive strip 19 is pivotally fixed. Attached under slight tension at its opposite ends, respectively, to the pointer arm, as at 20 in FIG. 3, and to a stud 21 that is fixed in the base plate 10, is a light coiled spring 22 that maintains a slight tension on the strip element 19 and moves the pointer in accordance with changes in length of the humidity sensitive strip 19. Adjustment of the bar 12 may be made to put a certain amount of tension in strip 19 and cause it to maintain pointer 17 functionally in indicating position relative to a graduated scale 23 that is formed on a plate 24, fixed to the base 10 across its upper end portion. This scale is graduated, for example, from 40 to 80 to designate by reference to the position of the pointer end relative thereto, the relative humidity of the atmosphere at any time.

The humidity sensitive element 19, in this particular instance is a very thin strip peeled from a cow's horn but might be of any other suitable element, such as, for example, a human hair or hairs. This element is attached by means of a clip 25 at its lower end to the pivot stud 18 and at its upper end is likewise attached by a clip 25' to a pivot stud 26 mounted by and extending outwardly from the swingingly adjustable end of bar 12.

To initially adjust or set the pointer 17 the instrument is disposed in an area of a constant temperature of, for example, 80° F. and a constant relative humidity of 50%. The screw 14 is then loosened and the bar adjusted to so tension the strip or element 19 as to bring the upper end of the pointer 17 into exact registration with the 50 mark on the graduated scale 23. After this has been done, the screw 14 is tightened to retain the bar in that adjustment. At that definite temperature, the pointer 17 will move along the graduated scale 23 to accurately designate any change in relative humidity. It is to be understood that the graduations on the scale 23 are accurately predetermined for this particular instrument.

Experiments have shown that, in an instrument of this kind which is not equipped with a compensating element to overcome error, the extent of pointer travel increases with the rise in relative humidity for each degree of rise in temperature. Therefore, in view of the fact that changes of temperature affect the accuracy of readings in a constant relative humidity, I have provided, as a compensating element, a bi-metal strip 30 which is interposed in the pointer, between its mounting end and its pointed outer end, as seen in FIGS. 1 and 2, which operates to slightly decrease or slightly lengthen the movement of the pointer end in accordance with temperature changes. That is, the bi-metal strip is so fixed at its opposite ends to the inner and outer end portions of the pointer 17 that, during any constant degree of relative humidity, should the temperature rise or fall, the pointer end will be adjusted accordingly to maintain the same relative humidity reading.

In this instrument, using a very thin strip or ribbon 19, turned from a cow's horn, as the humidity sensitive element, the coil spring 22 is so tensioned that the elastic limit of the ribbon is never impaired. In fact, its tension is usually less than three grams; this being substantially below that tension required to stretch the ribbon beyond its elastic limit even in a relative humidity of 100%.

It is shown in FIG. 2 that the plate 24 which mounts the graduated scale is outset from plate 10. To adapt the pointer to this condition, it is given an outwardly offsetting bend, at 28 that locates its pointed end quite close to the graduated scale so that the accuracy in taking readings will be improved.

When any adjustment is required by reason of change or repair of humidity sensitive elements 19, the screw 14 is first loosened slightly, and the adjustment of the outer end of bar 12 is made. Then the screw is again tightened to secure the adjustment.

The clips 25—25' at the ends of the horn strip 19 are punched to provide suitable holes to receive the pivot studs 18 and 26 therein.

Now referring to the instrument of FIGS. 5 to 9, herein designated as the alternative construction; the operating parts of this are also mounted on a back plate 10', across the lower end portion of which a metal bar 12b is flatly and horizontally applied. This bar, as is seen best in FIG. 8, is pivoted at its left hand end, to plate 10' by a screw 33, and at its right hand end is swingingly adjustable in an up and down direction. This bar 12b may be fixed at any position of its adjustment by tightening the screw 33.

Fixed to the front face of the upper portion of the plate 10', as in the device of FIG. 1, is an angularly bent, sheet metal plate 36 having a flat front or body portion on which a graduated scale 37 is marked, as in FIG. 1. This plate is here shown with an inturned flange 36' at its lower end that is secured to the back plate 10' and supports the main body portion of the plate on which the graduated scale 37 is marked in a position outwardly spaced from and parallel with the back plate 10' as has been shown in FIG. 6.

Fixed across the front of the plate 10' immediately below the lower, attached end of plate 36 is a bar 38, secured by two screws, 39—39' applied through holes in its left hand end portion and threaded into back plate 10' as in FIG. 7. The right hand end portion of this bar 38 is bent outwardly and back thus to provide a U-shaped strip mounting member 38' as seen in FIG. 7. Mounted by this member between its inside portion and the end of its back turned portion 38' is a circular disk-like member 40 on a pivot shaft 40' held in position for easy rotation, by a pivot screw 41. Fixed at its inner end to the disk 40 in a light weight pointer 43 having its pointed outer end disposed to follow the graduated scale 37 to indicate the relative humidity as controlled by the atmospheric effect on a humidity sensitive strip of horn 45. This strip is pivotally attached at its opposite ends, respectively, by means of clips 45' and 45' applied thereto, to a pivot stud 46 fixed in the adjustable end portion of bar 12b and a pivot stud 47 extended from the outer end of a short link 50 that connects the upper end of the strip 45 with the disk 40. This link 50 is pivoted to the disk 40 by a stud 51 that extends upwardly from the disc eccentrically thereof as shown best in FIG. 9.

The pull of the horn strip 45 is balanced by the tension of a coiled spring 52 that is fixed at one end as at 53 to the back plate 10' and at its other end is connected to the outer end of a short radial pin 54 extending from disk 40.

In this device, the arcuate form of link 50 has a very definite purpose, which will be understood by reference to FIG. 9, which shows that as the pointer 43 swings to the left, the pivot 51 swings across the top of the arc of its travel and hence the decrease from normal in the extent of lengthening of element 45 incident to rise in relative humidity through the lower temperatures does not materially affect the angular movement of the pointer and readings remain substantially accurate. However, if such is desired the pointer may be equipped between its pivoted and swinging ends, with a bi-metal compensating element as at 55 to avoid any inaccuracy.

What I claim as new is:

1. A relative humidity indicating instrument comprising, in combination, a base member and a graduated scale associated therewith, a pointer having a hub and a pivot member applied therethrough and mounting said pointer on said base member for swinging travel along said graduated scale, a stud fixed in said hub, outset from its pivot member, spring means acting on said pointer to urge it in one direction along said scale and a humidity sensitive element of belt form connected, under tension, at its ends, respectively to said base member and to said stud to balance the force of said spring means as applied to said pointer and operating in accordance with the lengthening or shortening of said element incident to humidity changes, to effect and control the pointer movement along the graduated scale; said stud being so located in said hub that the line of the points of pivotal connection of said humidity sensitive element with the base member and hub moves toward the axial line of said hub with rise of humidity.

2. The instrument of claim 1 wherein said pointer includes inner and outer end portions and a bi-metal strip joining said end portions and whereby movements of the outer end portion of the pointer, relative to the graduated scale, are increased and decreased in accordance with changes of temperature to which the humidity sensitive element is subjected.

3. The instrument of claim 1 in which a lever arm is fixed for swinging adjustment to said base member, and wherein said humidity sensitive element is pivotally connected at one end to the adjustable end portion of said lever arm to effect tension adjustment of said element for a proper setting of the pointer relative to said graduated scale.

4. The instrument of claim 3 wherein said lever arm extends and is adjustable in a plane parallel to the plane of the pointer's swinging movement and is adjustably fixed to said base member to normally extend substantially at a right angle to the direction of the humidity sensitive element.

5. The device of claim 3 wherein said humidity sensitive element has metal clips applied to its opposite end portions and said clips are punched to receive its pivotal connecting means with the pointer hub and lever arm.

6. A relative humidity indicating instrument comprising, a base member, a graduated scale mounted on said member, a pointer having a hub portion at one end, a pivot member applied axially through said hub portion and fixed in said base member to mount said pointer for swinging movement, at its outer end, along said graduated scale, a coiled spring attached to said base member and to said pointer to actuate it in one direction along said scale, a pivot pin extending from said pointer hub portion eccentrically thereof and a humidity sensitive belt pivotally connected at its opposite ends under tension, to said base member and said pivot pin for actuation of the pointer in accordance with humidity changes; said pivot pin being so located in the hub portion relative to its axial mounting as to effect progressively increased angular travel of the pointer, with a rise in temperature.

7. The device of claim 6 wherein a short link is pivotally joined at one end to the movable end of said humidity sensitive belt and, at its other end, is pivotally joined to said eccentrically located pivot pin, and said link is arcuately curved between its ends and its point of pivotal connection with said hub portion is normally at one side of the pivot on which the hub of the pointer is mounted where change in length of the belt incident to humidity changes causes greatest movement of the pointer.

8. A relative humidity indicator comprising a base member, a graduated scale mounted thereon, a pointer having a mounting hub member of disk form fixed thereto at one end, a pivot member applied through said hub member and mounting said pointer on said base member for the swinging travel of its outer end along said graduated scale, spring means attached under tension at one end to said base member and at its other end to said hub member to move the pointer in one direction and a humidity sensitive belt pivotally attached under tension at its opposite ends, respectively, to said base member and to said hub member for balancing said spring means and to actuate the pointer along said graduated scale in accordance with changes of relative humidity.

9. The device of claim 8 wherein the pivot member for attaching the humidity sensitive belt to said base member is fixedly mounted at one end of a lever arm and said lever arm is adjustably fixed, at its other end, to said base member, and which lever arm extends substantially at a right angle to the direction of the humidity sensitive belt and may be swingingly adjusted to establish the original setting of said pointer relative to markings on said graduated scale.

References Cited in the file of this patent

UNITED STATES PATENTS

| | | |
|---|---|---|
| 2,010,148 | Goss | Aug. 6, 1935 |
| 2,044,086 | Lewis | June 16, 1936 |
| 2,286,710 | Bohnstedt | June 16, 1942 |